(12) United States Patent
Alby et al.

(10) Patent No.: US 7,810,756 B2
(45) Date of Patent: Oct. 12, 2010

(54) COMPOSITE INTERNAL BEAM FOR REINFORCING THE STRUCTURE OF AN AIRCRAFT

(75) Inventors: Sebastien Alby, Tournefeuille (FR); Laurent Gauthie, Tournefeuille (FR); Philippe Bernadet, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 718 days.

(21) Appl. No.: 11/798,374

(22) Filed: May 14, 2007

(65) Prior Publication Data

US 2008/0156935 A1    Jul. 3, 2008

(30) Foreign Application Priority Data

May 17, 2006    (FR) .................................. 06 51778

(51) Int. Cl.
*B64C 1/06* (2006.01)
*E04B 1/00* (2006.01)

(52) U.S. Cl. .................. 244/119; 244/131; 52/272; 52/246

(58) Field of Classification Search ............... 244/119, 244/121, 131, 132; 52/834, 839, 843, 272, 52/246
See application file for complete search history.

(56) References Cited

U.S. PATENT DOCUMENTS

| | | | | |
|---|---|---|---|---|
| 2,382,358 A | * | 8/1945 | Watter | 244/131 |
| 3,694,990 A | * | 10/1972 | Pamer | 52/839 |
| 4,635,882 A | * | 1/1987 | SenGupta et al. | 244/119 |
| 4,728,059 A | * | 3/1988 | Stephen et al. | 244/119 |
| 5,899,412 A | | 5/1999 | DiIorio et al. | |
| 6,213,428 B1 | | 4/2001 | Chaumel et al. | |
| 6,378,805 B1 | * | 4/2002 | Stephan et al. | 244/119 |
| 6,648,273 B2 | * | 11/2003 | Anast | 244/119 |
| 7,134,629 B2 | * | 11/2006 | Johnson et al. | 244/119 |
| 7,155,874 B2 | * | 1/2007 | Lee | 52/843 |
| 7,159,822 B2 | * | 1/2007 | Grantham et al. | 244/119 |

FOREIGN PATENT DOCUMENTS

| | | |
|---|---|---|
| DE | 40 17 978 | 12/1991 |
| EP | 0 980 822 | 2/2000 |
| FR | 2 753 673 | 3/1998 |

* cited by examiner

*Primary Examiner*—Tien Dinh
*Assistant Examiner*—Joseph W Sanderson
(74) *Attorney, Agent, or Firm*—Young & Thompson

(57) ABSTRACT

A beam for reinforcing the structure of an aircraft is located inside the fuselage of the aircraft. The fuselage includes at least one pressurized zone (P) that is separated by at least one airtight wall (18) of at least one other non-pressurized zone (16), the beam and the at least one airtight wall being intersecting. The beam traverses the at least one airtight wall (18) that includes a cutaway that is adapted to the section of the beam, whereby sealing elements (30) are provided to ensure the sealing between the beam and the airtight wall (18) that is traversed.

18 Claims, 3 Drawing Sheets

COMPOSITE INTERNAL BEAM FOR REINFORCING THE STRUCTURE OF AN AIRCRAFT

This invention relates to a composite internal beam for reinforcing the structure of an aircraft.

Figure 1:
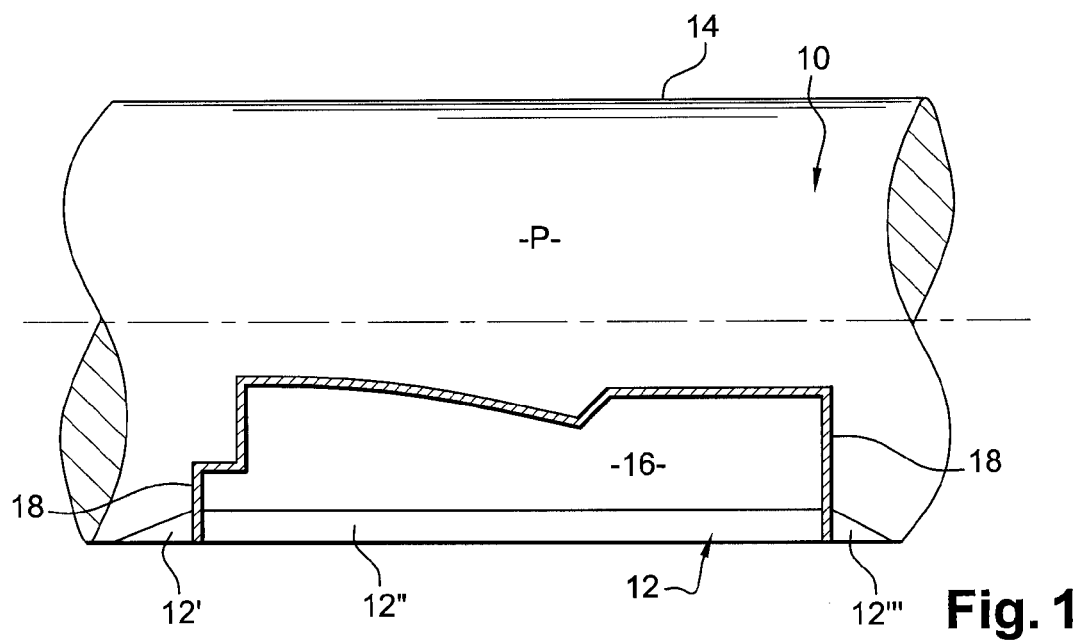

The structure of an aircraft comprises beams for making it rigid and for ensuring the taking-up of stress. Thus, as illustrated in FIG. 1, the central section 10 that is responsible for taking up stresses of the wing and that houses the compartment for the landing gear comprises a central beam 12 that is used inside the fuselage 14 for certain types of aircraft.

The fuselage 14 further comprises pressurized zones P and other zones 16 such as the center wing section and the compartment for the non-pressurized landing gear. To delimit these zones, airtight walls 18 are provided inside the fuselage 14.

Consequently, for the aircraft incorporating the ventral beam inside the fuselage, said beam 12 and the airtight walls 18 are intersecting.

Thus, the airtight walls 18 traverse the ventral beam 12 that is made in several sections 12', 12'', 12'''. As illustrated in detail in FIG. 2, to ensure the taking-up of stress, in particular traction/compression, fittings 20 are provided on both sides of the airtight wall 18 to connect the sections of the beam two by two.

According to an embodiment, the section of the ventral beam 12'' is positioned between the airtight walls and spliced at its ends thanks to compression fittings located facing shock-absorbing fittings placed outside non-pressurized zones 16. As is visible in FIG. 2, each fitting comprises a first plate 22 that can be brought to rest against the airtight wall 18 and a second plate 24 that is essentially perpendicular to the first plate 22, connected to the corresponding beam section by any suitable means. Advantageously, at least one reinforcement 26 can connect the two plates 22 and 24 and keep them essentially perpendicular.

The assembly is ensured by traction bolts 28 and attachments 28' that work by shearing.

This type of assembly is perfectly suited in the case of metal beams, made of aluminum alloy, the fittings ensuring the continuity of the beam and the transmission of stresses between the various sections.

However, so as to reduce the consumption of the aircraft, there is a tendency to replace the metal elements by elements made of composite materials so as to reduce the bulk of the device.

In the case of the ventral beam, the aluminum alloy sections of the beam that work in particular by traction/compression can be replaced by sections made of composite materials that are particularly suitable for supporting this type of stress. However, a metal fitting that can work by flexion at the junction of two plates 22, 24 cannot be replaced by an element of the same form of composite materials because such an element could not ensure the transmission of stresses between the two essentially perpendicular plates, whereby the composite materials, in particular based on carbon fibers, are not particularly well suited for working in flexion.

A hybrid solution that consists in providing composite material sections and metal fittings is not satisfactory. Actually, the combination of pieces made of these materials produces problems in matters of expansion and corrosion. Thus, it is necessary to reinforce the metallic pieces, in particular by oversizing them, to compensate for the internal constraints produced because of the expansion of the aluminum alloy that is clearly superior to that of the carbon.

Also, this invention aims at overcoming the drawbacks of the prior art by proposing an internal beam that makes it possible to reinforce the structure of an aircraft, compatible with the airtight walls that are provided inside the fuselage, able to be made of composite materials.

For this purpose, the invention has as its object a beam for reinforcing the structure of an aircraft, whereby said beam is located inside the fuselage of said aircraft, whereby said fuselage comprises at least one pressurized zone that is separated by at least one airtight wall of at least one other non-pressurized zone, the beam and said at least one airtight wall being intersecting, characterized in that said beam traverses said at least one airtight wall that comprises one cutaway that is suited to the section of said beam, whereby sealing means are provided to ensure the sealing between the beam and the airtight wall that is traversed.

This solution makes it possible to use a beam that is made of composite materials without needing metallic elements to transfer the charges from one side to the other of the airtight wall. Thus, according to the invention, the most stressed piece (in this case the beam) that is continuous is preferred and traverses the least stressed piece (the airtight wall).

Figure 2:
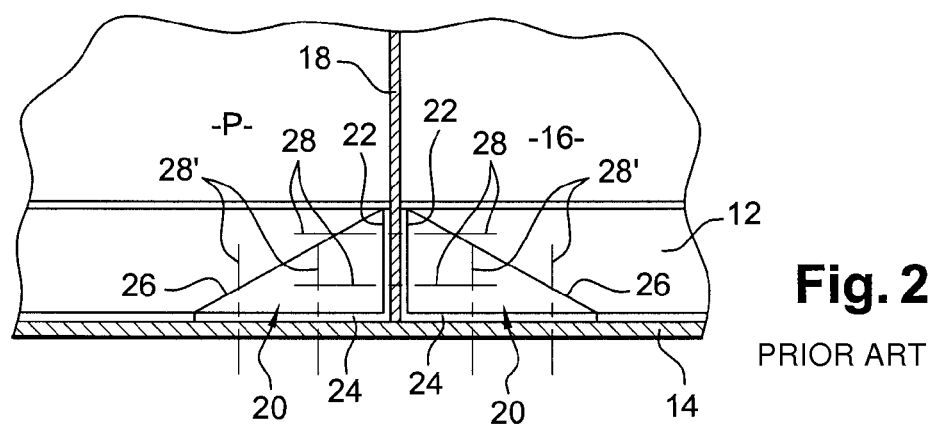
Figure 3:
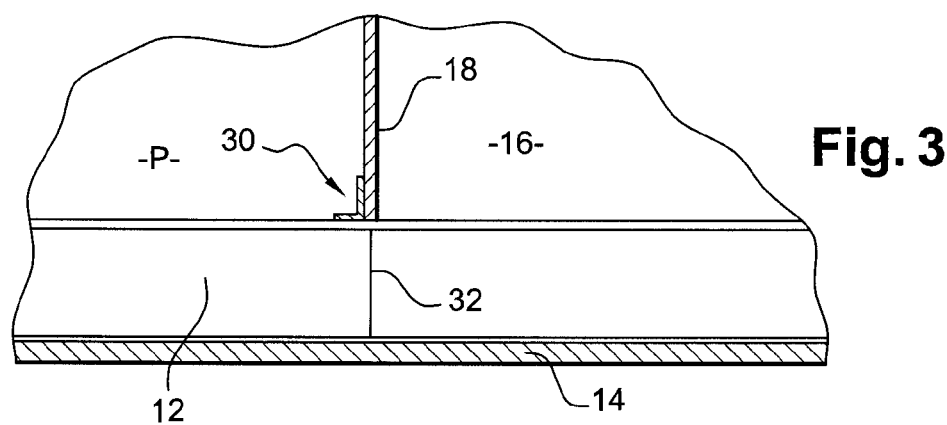
Figure 4A:
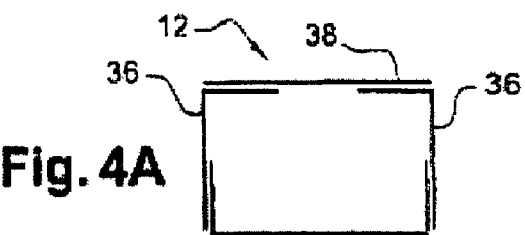
Figure 4B:
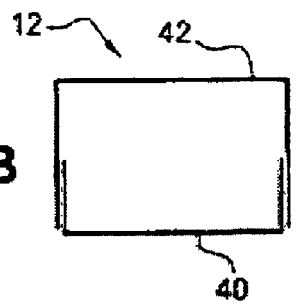
Figure 4C:
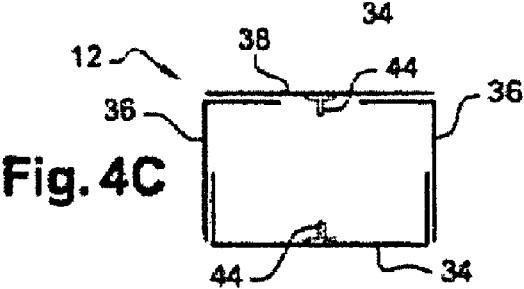
Figure 4D:
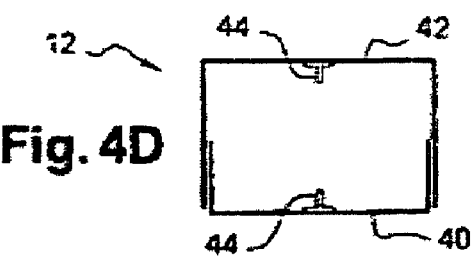
Figure 4E:
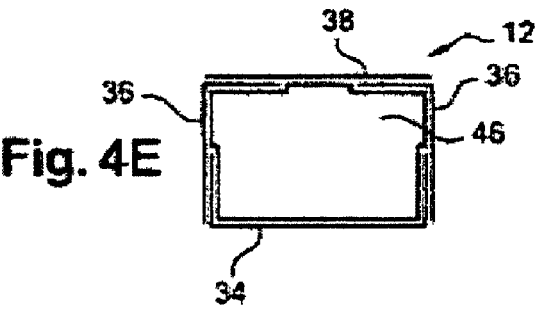
Figure 4F:
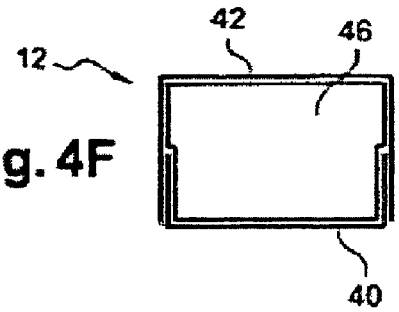
Figure 5A:
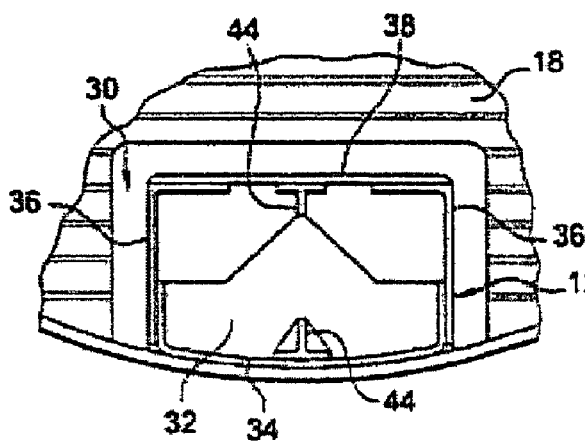
Figure 5B:
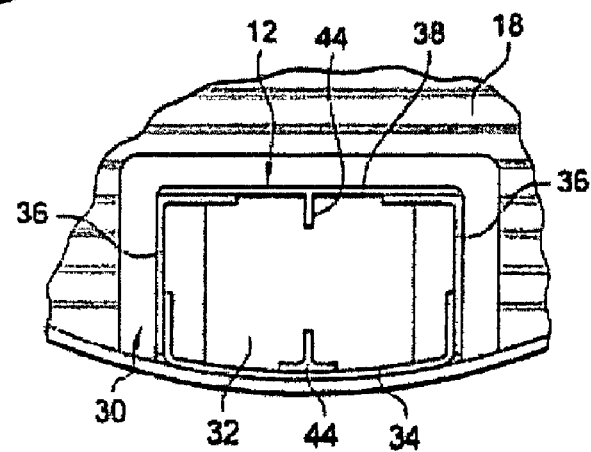
Figure 6:
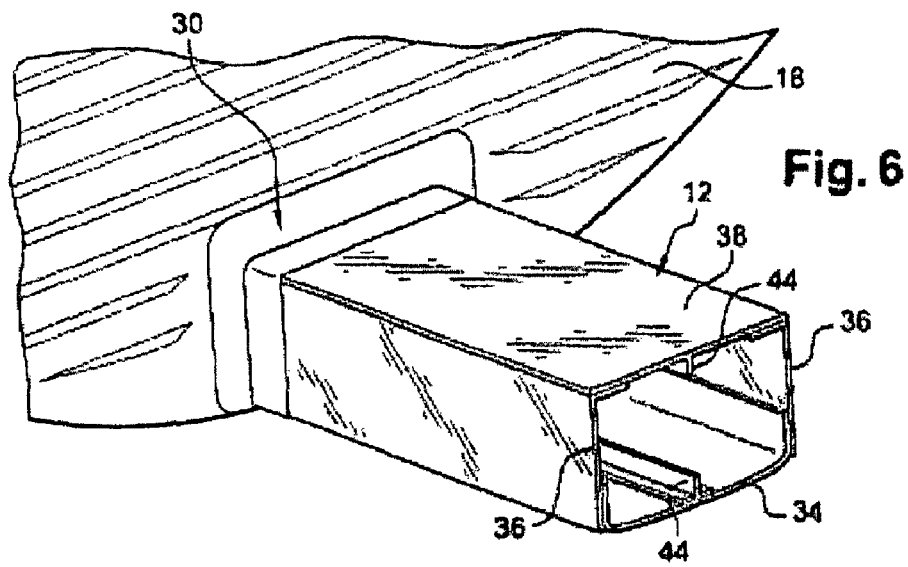
Figure 7:
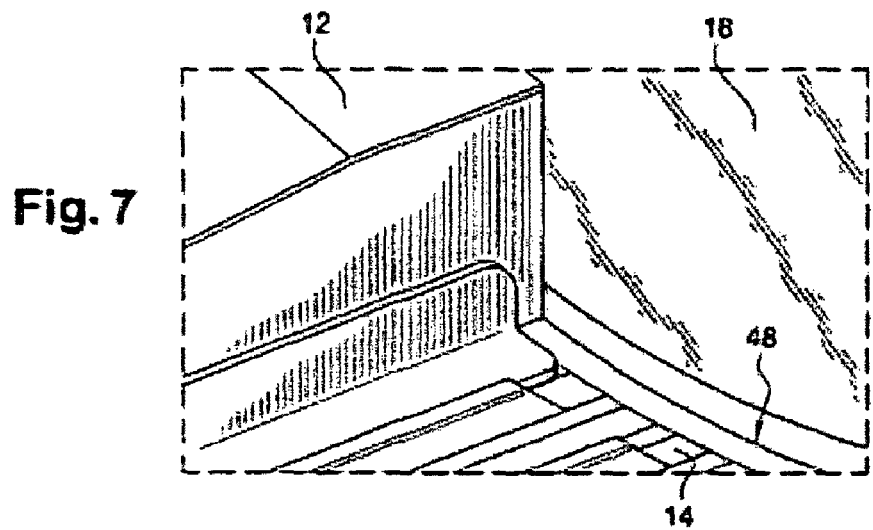
Figure 8:
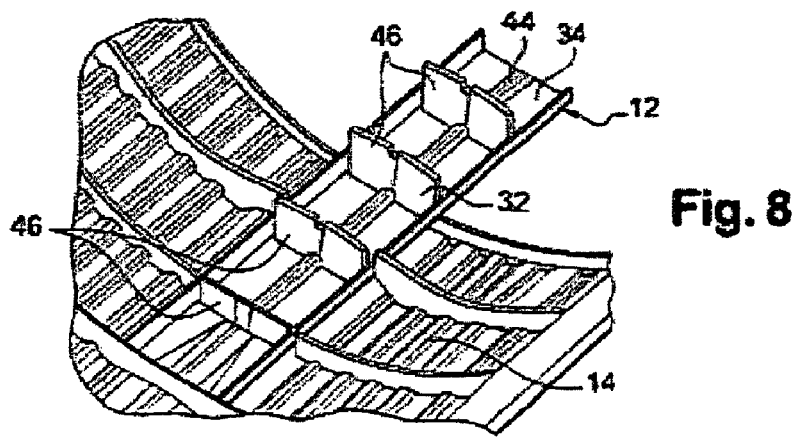

Other characteristics and advantages will emerge from the following description of the invention, a description that is provided only by way of example, with regard to the accompanying drawings, in which:

FIG. 1 is a diagram that illustrates a vertical longitudinal cutaway of a portion of the fuselage of an aircraft, FIG. 2 is a vertical longitudinal cutaway illustrating the connection between two beam sections located on both sides of an airtight wall according to the prior art, FIG. 3 is a vertical longitudinal cutaway illustrating a beam traversing an airtight wall according to the invention, FIGS. 4A to 4F are diagrammatic representations illustrating by transversal cutaway a beam according to different variants of the invention, FIGS. 5A and 5B are cutaways illustrating variant embodiments of a beam according to the invention traversing an airtight wall, FIG. 6 is a perspective view illustrating a beam and a traversed airtight wall, in a first direction of a side of said airtight wall, FIG. 7 is a perspective view illustrating a beam and a traversed airtight wall, in a second direction of the other side of said airtight wall, and FIG. 8 is a perspective view illustrating the lower portion of a beam according to the invention with a number of transversal ribs.

In FIG. 1, the central section of an aircraft responsible for picking up the wing is shown at 10. A so-called ventral beam 12 is provided to make the structure of the aircraft rigid and in particular to make that of the central section 10 rigid, whereby said beam is located in the lower portion of the fuselage of the aircraft that is referenced 14. The ventral beam is thus flattened against the lower portion of the fuselage, which is also called a bottom structure. The ventral beam is made integral with the bottom structure at least at each of its ends by any suitable means.

At the central section, at least one zone P of the fuselage is pressurized and separated by at least one airtight wall 18 of at least one other non-pressurized zone 16 such as, for example, the compartment for the landing gear or the center wing section.

Even if it is particularly suited to the ventral beam, this invention is not limited to this beam and could be applied to other beams, such as, for example, the lateral longitudinal beams that edge the compartments of front and rear landing gear.

Also, for the invention, a beam is defined as any element that is used to make the structure of an aircraft rigid.

This invention relates to the so-called internal beams used inside the fuselage that can be intersecting with the airtight walls 18.

According to the invention, the beam 12 is one-piece and extends over its entire length and traverses at least one airtight wall 18 that comprises a cutaway that is suitable for the section of said beam 12, whereby means 30 for sealing are provided for ensuring the sealing between the beam 12 and the traversed airtight wall 18.

Contrary to the prior art, the ventral beam does not comprise several sections.

According to an embodiment, the beam is hollow and comprises an essentially rectangular or square section.

In the case of the ventral beam, it extends from its front end that is located toward the front of the front beam of the central wing compartment up to its rear end that is located behind the rear airtight wall of the landing gear compartment.

According to an embodiment, the ends of the ventral beam 12 are beveled, the upper surface of the beam joining the lower surface to the ends.

Advantageously, at least one airtight partition 32 is provided inside the beam, essentially in the same plane as the airtight wall or walls 18 traversed by the beam so as not to pressurize the entire interior of the ventral beam. To the extent that the airtight partition 32 is surrounded by a beam section with rigid walls, it does not need to be reinforced, for example to resist compression stresses. Weakly stressed mechanically, the airtight partition 32 acts as a pure membrane.

The invention is not limited to structures made of composite materials. Thus, the ventral beam 12 and the airtight wall 18 can be made of composite materials or can be metallic; the beam 12 can be made of composite materials and the airtight wall 18 can be metallic or vice versa. Finally, each of the different elements could comprise metallic parts and others made of composite materials. Preferably, the ventral beam is made of composite materials.

According to the variants, the ventral beam 12 can be composed of several sub-elements.

According to the variants illustrated in FIGS. 4A, 4C, 4E, 5A and 5B, the beam comprises (according to a transversal section), a lower U-shaped cap 34 whose branches are surmounted by two lateral inverted L-shaped longitudinal beams 36 on which rests a planar upper cap 38.

According to other variants illustrated in FIGS. 4B, 4D and 4F, the beam comprises (according to a transversal section), a lower U-shaped cap 40 and an upper inverted U-shaped cap 42.

According to the variants, elements for reinforcing the beam can be provided. Thus, at least one longitudinal rib 44 can be extended over at least one portion of the length of the beam. Preferably, a longitudinal rib 44 is made integral with the lower cap 34 or 40 and/or with the upper cap 38 or 42. According to the illustrated embodiments, the longitudinal rib 44 is located at the median longitudinal plane of the beam.

According to an embodiment illustrated in FIGS. 4C, 4D, and 5A, the longitudinal rib 44 comes in the form of a T related to the element with which it is made integral. According to another embodiment illustrated in FIG. 5B, the longitudinal rib has come from a single support with the element with which it is made integral, the upper cap in the illustrated example.

According to another characteristic of the invention, the beam 12 comprises at least one transversal reinforcement rib 46, as illustrated in FIGS. 4E, 4F, 5A, and 5B. Advantageously, as illustrated in FIG. 8, the beam comprises a number of transversal ribs 46 that are carefully distributed over the length of the beam. These ribs make it possible to reinforce the beam in the case of constraints acting in a plane that is essentially transversal to the beam. They also make it possible to reinforce the beam in the zones where elements such as a landing gear flap are suitable for being grafted.

Advantageously, certain transversal ribs 46 may have the function of an airtight partition 32.

According to the variants, a transversal rib 46 may be produced from a single support or may comprise several sub-elements, as illustrated in the FIGS. 5A and 5B.

The sealing means 30 can come in the form of at least one L-shaped angle bar, as illustrated in FIG. 6, in particular when the airtight wall 18 is made of composite materials. As a variant, they may come in the form of a curved and machined edge, made at the airtight wall 18 when the latter is metallic. Generally, the sealing means 30 between the airtight wall and the beam may be identical to the sealing means 48 provided between the airtight wall and the bottom structure, as illustrated in detail in FIG. 7. Thus, according to the example that is illustrated in FIGS. 6 and 7, L-shaped angle bars ensure the sealing, on the one hand, between the beam and the airtight wall, and, on the other hand, between the airtight wall and the bottom structure.

Advantageously, as illustrated in FIG. 6, the sealing means 30 are located in the pressurized zone P, whereby one of the L-shaped branches of the angle bar is made integral with the airtight wall whereas the other branch is made integral with the beam. According to an embodiment, the L-shaped angle bar is continuous along the three faces of the beam that are able to be oriented toward the airtight wall.

The invention claimed is:

1. A beam for reinforcing the structure of an aircraft, the beam being located inside the fuselage of the aircraft, the fuselage including at least one pressurized zone that is separated by at least one airtight wall from at least one non-pressurized zone,
   wherein the beam intersects the at least one airtight wall,
   wherein the beam traverses the at least one airtight wall, the at least one airtight wall including a cutaway that corresponds to the intersecting section of the beam,
   wherein sealing means are provided to ensure sealing between the beam and the at least one airtight wall that is traversed, and
   wherein the beam has a hollow section and comprises therein at least one airtight partition essentially in the same corresponding plane as the at least one airtight wall traversed by the beam.

2. The beam according to claim 1, wherein the beam is made of composite materials.

3. The beam according to claim 1, wherein the beam comprises a lower U-shaped cap whose branches are surmounted by two lateral inverted L-shaped longitudinal beams on which rests a planar upper cap.

4. The beam according to claim 1, wherein the beam comprises a lower U-shaped cap and an upper inverted U-shaped cap.

5. The beam according to claim 1, wherein the beam comprises at least one longitudinal rib that extends over at least one portion of the length of the beam.

6. The beam according to claim 1, wherein the beam comprises at least one transversal reinforcement rib.

7. The beam according to claim 6, wherein the beam comprises plural said transversal ribs distributed over the length of the beam so as to reinforce the beam in zones subjected to constraints acting in a plane that is essentially transversal to the beam.

8. The beam according to claim 1, wherein the sealing means comprise at least one L-shaped angle bar.

9. The beam according to claim 1, wherein the beam is a ventral beam.

10. Aircraft structure comprising,
at least one airtight wall that separates a pressurized zone from a non-pressurized zone, and
at least one beam that is inside the fuselage of the aircraft,
wherein the at least one beam intersects the at least one airtight wall,
wherein the at least one airtight wall comprises a cutaway corresponding to the intersecting section of the at least one beam,
wherein the at least one beam traverses the at least one airtight wall at the cutaway,
wherein sealing means are provided to ensure sealing between the at least one beam and the traversed at least one airtight wall, and
wherein the at least one beam includes a hollow section and comprises therein at least one airtight partition essentially in the same corresponding plane as the at least one airtight wall traversed by the at least one beam.

11. The aircraft structure according to claim 10, wherein the at least one beam is made of composite materials.

12. The aircraft structure according to claim 10, wherein the at least one beam comprises a lower U-shaped cap whose branches are surmounted by two lateral inverted L-shaped longitudinal beams on which rests a planar upper cap.

13. The aircraft structure according to claim 10, wherein the at least one beam comprises a lower U-shaped cap and an upper inverted U-shaped cap.

14. The aircraft structure according to claim 10, wherein the at least one beam comprises at least one longitudinal rib that extends over at least one portion of the length of the beam.

15. The aircraft structure according to claim 10, wherein the at least one beam comprises at least one transversal reinforcement rib.

16. The aircraft structure according to claim 15, wherein the at least one beam comprises plural said transversal ribs distributed over the length of the at least one beam so as to reinforce the at least one beam in zones subjected to constraints acting in a plane that is essentially transverse to the at least one beam.

17. The aircraft structure according to claim 10, wherein the sealing means comprise at least one L-shaped angle bar.

18. The aircraft structure according to claim 10, wherein the at least one beam is a ventral beam.

* * * * *